March 14, 1944.  J. A. LAUCK  2,344,465
FLOW EQUALIZER
Filed Feb. 26, 1943  2 Sheets-Sheet 1
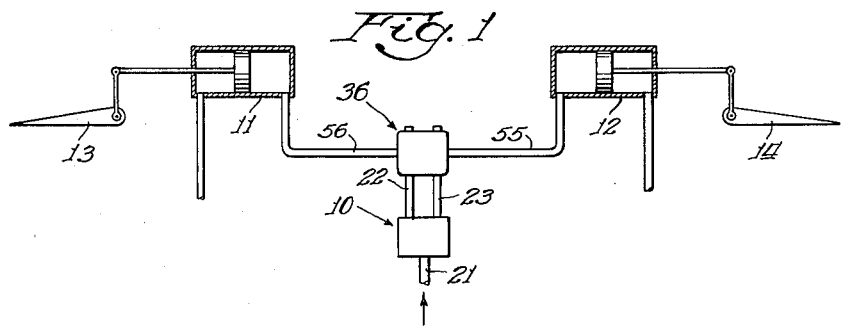
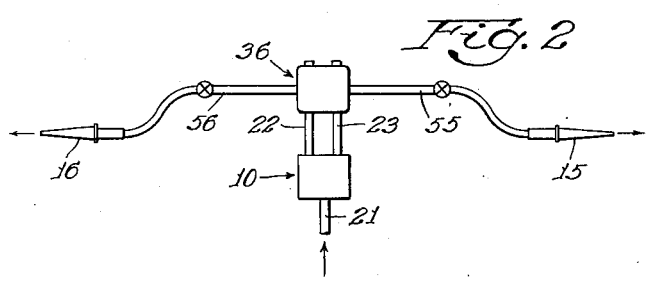
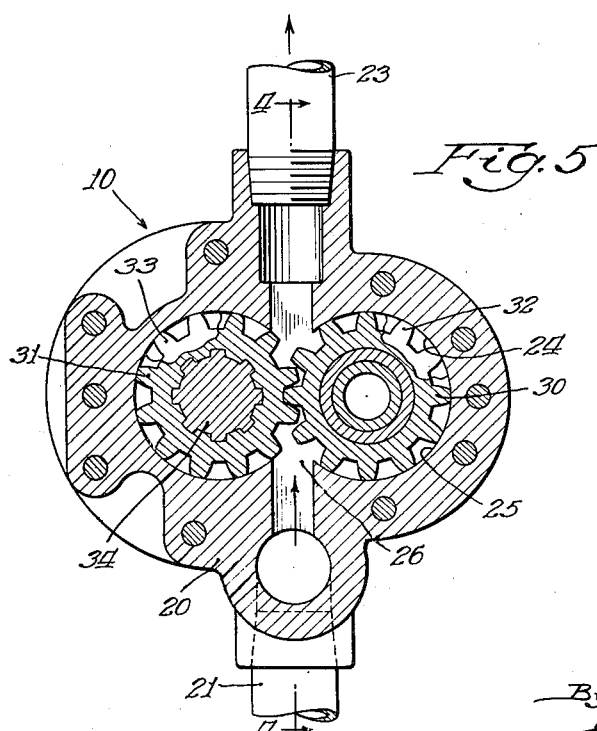
Inventor:
John A. Lauck
By Edward C. Fitzhaugh
Atty.

March 14, 1944.    J. A. LAUCK    2,344,465
FLOW EQUALIZER
Filed Feb. 26, 1943    2 Sheets-Sheet 2

Inventor:
John A. Lauck
By: Edward C. Fitzhugh
Atty.

Patented Mar. 14, 1944

2,344,465

UNITED STATES PATENT OFFICE 2,344,465

FLOW EQUALIZER

John A. Lauck, South Euclid, Ohio, assignor to Pesco Products Co., Cleveland Ohio, a corporation of Ohio Application February 26, 1943, Serial No. 477,293

9 Claims. (Cl. 137—144)

This application is a continuation-in-part of my copending application Serial No. 314,209 filed January 17, 1940.

The present invention relates to valve means adapted to be associated with a plurality of passages or conduits for maintaining desired pressure or flow conditions therein.

The principal object of the invention is to provide flow equalizing means for use with gear type metering units or other means supplying a plurality of fluid streams under pressure the volumetric flow of which it is desired to accurately control.

Another object of the invention is to provide a flow equalizing valve structure for maintaining desired pressure and flow ratio conditions through a plurality of conduits, and which valve structure is operable in response to certain conditions in one conduit to produce like conditions in another conduit.

Still another object of the invention is to provide means for maintaining a predetermined volumetric flow ratio in a plurality of streams irrespective of variations in the resistance to flow in said streams.

A still further object of the invention is to provide a device including a plurality of pressure responsive valves associated with respective flow lines and arranged so that a rise in pressure in the outlet of one of said lines effecting an increase in resistance to flow therethrough will produce a similar increase in a line of lower pressure to bring the pressure in said last-mentioned line up to the pressure existing in the line of higher pressure to thereby cause the flow in said lines to always bear the same volumetric relationship to one another.

A further object of the invention is to provide a throttling valve assembly adapted to be interposed in two fluid lines under pressure and to function to maintain two corresponding points in said two lines at the same pressure.

A still further object of the invention is to provide an improved assembly of throttling valves and operating means therefor effective to carry out the above enumerated objects.

Further and more specific objects, advantages and uses of my invention will become apparent from reading the following detailed specification taken in connection with the drawings forming a part thereof, wherein:

Fig. 1 is a schematic layout showing one application of the preferred embodiment of my invention;

Fig. 2 is a schematic layout showing a second application of the preferred embodiment of my invention;

Figure 3:
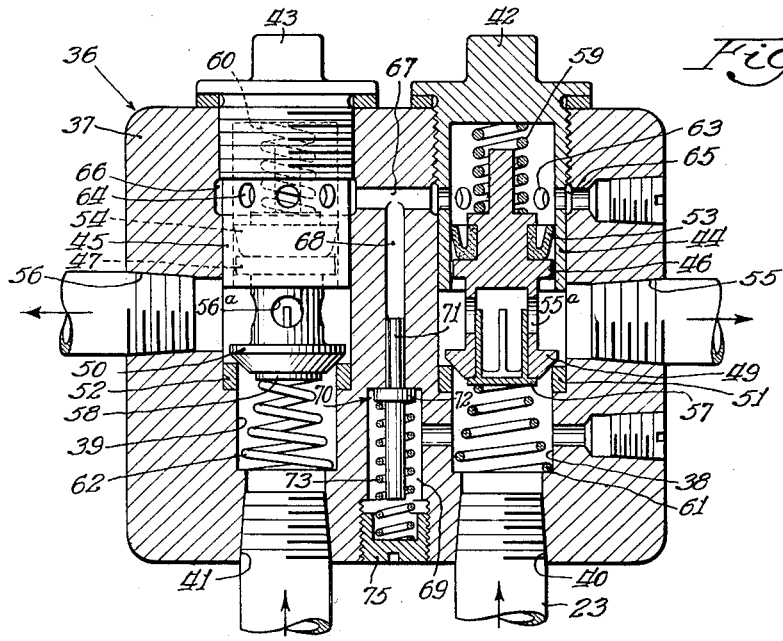
Fig. 3 is an enlarged cross section view indicating the relation of elements comprising the details of my throttling valve equalizer assembly.
Figure 4:
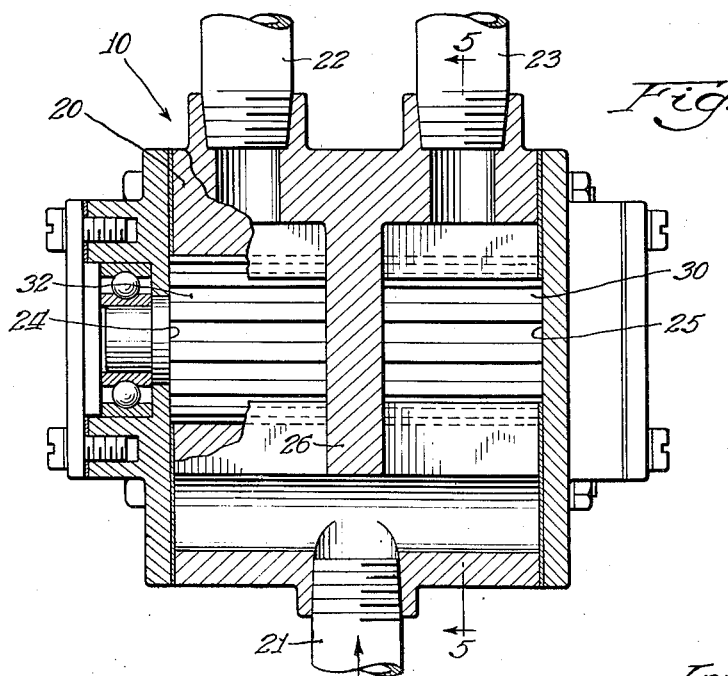

Fig. 4 is an enlarged cross section view of a gear type of fluid stream divider on which the equalizer throttling valve mechanism of Fig. 2 is particularly adapted to maintain identical back pressures in each outlet stream; and Fig. 5 is a section taken in part on line 5—5 of Fig. 4, and showing the gears on the right in Fig. 4 broken away to indicate the presence of a companion set of gears therebehind.

Referring to the figures of the drawings, it will be seen that my improved fluid divider or metering arrangement has wide application where the problem exists of dividing a single stream into a plurality of streams of predetermined proportion and maintaining this proportion irrespective of variations in the back pressure due to variation in the resistance to flow in the respective streams. In Fig. 1 there is illustrated the application of the present invention in the novel combination covered in the parent case and including the delivery of identical quantities of fluid to remotely located rams or piston motors 11, 12 for synchronizing movement of aircraft landing flaps 13, 14 or other elements of an aircraft fuselage requiring synchronization. Turning to Fig. 2 of the drawings there is illustrated schematically, by way of example only, an arrangement for delivering pressure fluid from my improved fluid divider assembly to two variable resistances to flow, this delivery arrangement being of a conventional type and serving merely to indicate the broad character of the invention. Nozzles 15, 16 and associated valves are shown only as indicating one well known arrangement for directing and adjusting the resistance to flow of fluid from my improved fluid divider. It will be apparent that variations in the resistance to flow through the respective outlet conduits 55 and 56 may result from accumulation of different quantities of deposits in said respective conduits, or this same condition may be simulated by adjustment of the conventional valves indicated. Under such conditions of unequal resistance to flow, my improved divider construction will continue to be effective to deliver the same proportional quantities of fluid through conduits 55 and 56.

I have found that where a divider is employed having movable or fluid displaceable metering elements therein, including particularly a divider of the meshing gear type, that the volumetric efficiency of each unit of such divider varies with variations in the back pressure exerted thereon by the several outlet streams. I have found that by placing a throttling valve in each outlet stream from the respective gear divider units and providing means responsive to the highest pressure in any one outlet stream effective to cause the throttling valve in the other streams to throttle the flow therethrough and thus maintain the same back pressure on each unit of the divider the volumetric efficiencies of each unit are maintained substantially identical.

The preferred form of rotary divider assembly comprises generally, a gear divider housing 20 (Fig. 4) formed with a single inlet connected with a line 21 serving as a pressure supply conduit and a plurality of outlets respectively connected with lines or conduits 22, 23. This housing is divided into a plurality of parallel gear-receiving chambers 24, 25 separated by a partition 26, all of the chambers being in common communication on the inlet side and in individual communication on the outlet side with the separate outlet conduits 22, 23. These chambers are in the form of overlapping bores and receive pairs of intermeshing gears 30, 31, 32, 33 therein, one gear of each pair being keyed to a common shaft 34 extending through the housing for the purpose of forcing all of the gears to rotate in synchronism. No claim is made in this case to this gear divider per se, apart from the combination herein claimed as the same is covered by Johnson Patent No. 2,291,578.

As above pointed out, I have found that the volumetric efficiency, or, in other words, the volume displacements, of the respective pairs of gears vary with variations in the resistances to flow from the respective outlets. It is necessary that the volumetric efficiencies of the respective pairs of gears be maintained identical if the relative proportions of the outlet streams are to be maintained constant. Therefore, I have provided in combination with the above described gear divider, means for maintaining the volumetric efficiencies of the several gear units constant.

The preferred form of my pressure regulating assembly 36 for maintaining the pressure at the outlets of each unit of the gear divider equal, comprises a housing 37 formed with transverse bores 38, 39 terminating at one end in threaded inlet openings 40, 41 and receiving in the other ends thereof closure plugs 42, 43. These closure plugs have depending tubular skirt portions 44, 45 adapted to function as cylinders for the reception of piston-like elements 46, 47 forming extensions of separate independently operable throttling valves 49, 50 which in turn are adapted to cooperate with seats 51, 52 carried in the housing bores. Outlet passages 55, 56 communicate with the bores at a position between the terminal portions of the cylinder-defining skirts and the valve seats.

The valves include a disc-like type of valve proper 49, 50 arranged to cooperate with seats 51, 52 and having an axially extending tubular stem terminating in piston-like portions 46, 47 received within the cylindrical skirts 44, 45 with a small clearance or loose fit therebetween. The valve stems beyond piston 46, 47 are reduced in size and receive flexible upturned one-way seals 53, 54 which permit limited flow of fluid therepast in the direction opposite valves 49, 50 but prevent flow in the reverse direction. The valve stems are formed with a plurality of radially extending orifices 55ª and 56ª through the wall thereof in communication with the corresponding outlet opening on one side and in communication on the inside with return valves 57, 58 operating in a centrally orificed lower portion of the throttling valves for providing return flow. The throttling valves are urged in the direction of closed position by means of coil compression springs 59, 60 while the return valves 57, 58 are similarly urged in the direction of closed position by second compression springs 61, 62.

The interiors of the tubular skirts are placed in communication above the upper ends of their respective associated piston members by means of a plurality of radial ports 63, 64 therethrough communicating with annular recesses 65, 66 in the housing bore and through a transverse joining passage 67.

It will thus appear that should the pressure of the fluid being discharged by a first one of said valves increase over the pressure of the fluid being discharged by the other, due to any cause whatsoever, this will result in fluid passing between the piston-like portion of the first valve and the cylinder-like piston receiving skirt, thence past the one-way seal and into communication with the opposite portion of the seal associated with the stem of the other valve. Since the second seal is constructed in the same manner as the first seal, the fluid will not be permitted to pass thereby but will force the wall of the seal into sealed engagement with the associated skirt wall, thus forcing the valve in the direction of its seat. This will result in a drop of pressure across the second valve and a back pressure on the gear divider associated therewith which is substantially identical with the back pressure on the other gear unit. With the back pressures the same acting on the gear units the respective units function with equal volumetric efficiency and the same proportional quantities of fluid will be transmitted from the separate outlets of the regulator irrespective of variations in the resistance to flow in the streams leading from the regulator.

In order to provide for the readjustment of the piston assembly of the regulator following operation, or more specifically to effect the return of the liquid forced above the piston-like portions there is provided an axially extending passage 68 in communication with a pressure relief chamber 69 in turn having communication with one of the outlet lines 23 leading from a gear unit of the gear divider. A valve 70 controls the communication of this pressure relief chamber with the space above the pistons, and includes a cylindrical stem 71 extending within a cylindrical portion of the axial passage 68 and having a flange-like valve portion 72 proper normally held in engagement with the wall of the pressure relief chamber by means of a compression spring 73. A limited tolerance exists between the cylindrical stem 71 and the passage receiving the same which provides for a controlled or limited flow when the pressure acting on the stem becomes greater than the pressure existing within the pressure relief chamber 69. This condition occurs when the pressure stream leading to the inlet of the gear divider has been cut off and consequently the pressure in the outlet communicating with the pressure relief chamber has been reduced below that existing above the piston-like portions of the throttling valves.

A closure plug 75 is provided in the end wall of the pressure relieving chamber in threaded relation thereto for the purpose of adjusting the compression spring 73 cooperating with the valve 70 therein.

While I have disclosed my back pressure controlling valve assembly in its relationship with a gear type of fluid stream divider and claim that invention exists therein, I nevertheless also contemplate the use of this pressure control throttling valve assembly as having other general applications. It will also appear that in certain less exacting installations my throttling valve pressure control assembly may be employed alone to produce a fluid stream division. This is true since the volume of flow past the throttling valves will be substantially the same providing the pressure tending to hold these valves closed is the same.

While I have described my invention in connection with certain specific embodiments thereof, it is to be understood that this is by way of illustration and not by way of limitation and the scope of my invention is to be defined by the appended claims which should be construed as broadly as the prior art will permit.

I claim:

1. Means for equalizing the inlet pressure in a plurality of separate pressure fluid passages, normally receiving fluid under pressure from separate conduits in which the respective pressures may vary within equalizable limits, irrespective of variations in pressure to which the outlet of said passages is subjected, comprising: separate fluid pressure operable throttle valves associated respectively with each of said passages and arranged to provide variations in the restriction to flow through said passages, each of said throttle valves including a piston for positioning the same, said piston being subject on one side thereof to the pressure in its associated outlet, and at its other side to pressure in a chamber formed at its other side; means providing for limited one-way flow of pressure fluid around said piston from the associated outlet into said chamber; a passageway interconnecting the chambers of said throttle valves, the arrangement being such that an increase in pressure in one of said outlets in excess of that in another will be transmitted to the chamber having the lower pressure to effect a throttling action of its valve to restrict flow to its associated outlet to thus equalize the pressures in the inlets of said passages; and means for relieving a given excess of pressure in said chambers relative to the pressure in one of said passages.

2. Means for equalizing the inlet pressure in a plurality of separate pressure fluid passages, normally receiving fluid under pressure from separate conduits in which the respective pressures may vary within equalizable limits, irrespective of variations in pressure to which the outlet of said passages is subjected, comprising: separate fluid pressure operable throttle valves associated respectively with each of said passages and arranged to provide variations in the restriction to flow through said passages, each of said throttle valves including a pressure-responsive motive means for positioning the same, said motive means being subject on one side thereof to the pressure in its associated outlet, and at its other side to pressure in a chamber formed at its other side; means providing for limited one-way flow of pressure fluid around said motive means from the associated outlet into said chamber; a passageway interconnecting the chambers of said throttle valves, the arrangement being such that an increase in pressure in one of said outlets in excess of that in another will be transmitted to the chamber having the lower pressure to effect a throttling action of its valve to restrict flow to its associated outlet to thus equalize the pressures in the inlets of said passages; and means for relieving a given excess of pressure in said chambers relative to the pressure in one of said passages.

3. Means for equalizing the inlet pressure in a plurality of separate pressure fluid passages normally receiving fluid under pressure from separate conduits in which the respective pressures may vary within equalizable limits, irrespective of variations in pressure to which the outlet of said passages is subjected, comprising: separate fluid pressure operable throttle valves associated respectively with each of said passages and arranged to provide variations in the restriction to flow through said passages, each of said throttle valves including a piston for positioning the same, said piston being subject on one side thereof to the pressure in its associated outlet, and at its other side to pressure in a chamber formed at its other side; packing means between said piston and chamber providing for limited one-way flow of pressure fluid from the associated outlet into said chamber; a passageway interconnecting the chambers of said throttle valves, the arrangement being such that an increase in pressure in one of said outlets in excess of that in another will be transmitted to the chamber having the lower pressure to effect a throttling action of its valve to restrict flow to its associated outlet to thus equalize the pressures in the inlets of said passages; and means for relieving a given excess of pressure in said chambers relative to the pressure in one of said passages.

4. In an equalizing valve assembly, a housing having a pair of cylindrical bores therein, one terminal of each forming an inlet port and which inlet ports are adapted to receive equalizable pressures, the other terminals of each bore being closed by threaded plugs having tubular skirts extending into said bore and defining a pair of cylinders, a valve seat spaced from the lower end of each of said tubular skirts, a separate valve assembly in each of said bores including a disc-like valve for cooperating with each of said seats, stem-like portions extending from the back face of each of said valves and terminating in piston-like portions loosely cooperating with said skirt defining cylinders, a pair of outlet ports in communication with the back face of each of said valves and with the under side of said piston portions, a passage formed in said housing placing said cylinders in communication with each other above the normal travel of each of said piston portions, said pistons being provided with one-way sealing rings permitting limited flow thereby in the direction away from said inlet port only, the arrangement being such that an increase in pressure at one of said outlet ports relative to the pressure at the other outlet port is effective to cause flow of fluid from the outlet port having the higher pressure past its corresponding piston and into communication with the piston associated with the outlet port having the lower pressure, thus causing the valve associated with said last-mentioned outlet port to be urged in the direction of its seat an amount necessary to cause the pressure in the respective inlet ports to be maintained the same; and a relief valve in communication with said passage arranged to relieve a given excess of pressure in said cylinders relative to the pressure in one of said bores.

5. In an equalizing valve assembly, a housing having a pair of bores therein, one end of which bores terminate in a pair of inlet ports arranged to receive equalizable pressures, the other ends having means closing the same, valve seats in said bores facing away from said inlet ports, outlet ports formed in said housing in communication with said valve seats at a point between said seats and the closed ends of said bores, a separate valve assembly cooperating with each of said valve seats, each valve assembly including a disc-like valve, having a tubular stem extending from the rear face of said disc-like valve and terminating in a piston-like portion loosely cooperating with the corresponding cylindrical bore beyond the point of communication therewith of said corresponding outlet port, said piston-like portion being provided with a one-way sealing ring effective to permit limited flow of fluid from under said piston-like portion to a point thereabove and into the closed end portion of said corresponding bore, a first passage formed in said housing placing the closed end portions of said bores in communication above said piston-like portions, the arrangement being such that an increase in pressure at one of said outlet ports relative to the pressure at the other outlet port is effective to cause flow of fluid from the outlet port having the higher pressure past its corresponding piston and into communication with the piston associated with the outlet port having the lower pressure, thus causing the valve associated with said last-mentioned outlet port to be urged in the direction of its seat an amount necessary to cause the pressure in the respective inlet ports to be maintained the same; a second passage in said housing connecting said communicating passage with one only of said cylindrical bores at a point below the corresponding disc-like valve, said second passage being provided with a one-way check valve therein effective to maintain such second passage closed so long as the pressure below said valve and in said one cylindrical bore with which second passage is in communication remains at a value equal to or above that in the closed end portions of said bores but permitting the leak back of liquid through said check valve when said pressure falls below the value of pressure in said closed end portions of said bores by a predetermined amount.

6. In an equalizing valve assembly, a housing formed with a pair of cylindrical bores therein, one end of which is closed and the other ends terminating in a pair of inlet ports arranged to receive equalizable pressures, valve seats positioned between the ends of said bores and facing away from said inlet ends, a separate valve assembly in each of said bores including disc-like valves for cooperation with said seats, a stem portion extending from the rear face of each of said valves and terminating in a piston-like portion cooperating loosely with said cylindrical-like bore, said piston-like portion being provided with a one-way seal permitting limited flow of liquid from below said piston into the space formed between said piston and said closed end of said bore, a passage formed in said housing placing the upper closed end portion of said bores in communication, an outlet port formed in said housing in communication with the upper face of each of said disc-like valves below said piston-like portion, the arrangement being such that a rise in pressure at one of said outlet ports causes the fluid to pass up between its corresponding piston and seal and hence into communication with the seal of the piston subject to lower pressure, thus urging the disc-like valve associated with said last-mentioned piston in the direction of its seat an amount necessary to cause the pressure below the last-named disc valve to rise to a value corresponding to the value of the pressure in said one outlet port, said disc-like valves each being further particularly characterized by the formation of a central port therethrough defining a valve seat facing in the direction of said inlet port, a valve normally received on each of said seats, and a spring for normally urging said valves into engagement with said seats whereby reversal of flow through said valve assembly may be effected through said second-named valves; and a relief valve in communication with said passage arranged to relieve a given excess of pressure in said cylinders relative to the pressure in one of said bores.

7. In an equalizing valve assembly, a housing having means defining a plurality of bores therein, a first terminal of each of the respective bores forming an inlet port and which inlet ports are arranged to receive equalizable pressures, the opposite terminals of each of said bores having means closing the same, valve seats positioned between the terminals of said respective bores, outlet openings formed in said housing in communication with said respective bores intermediate said terminals thereof, a separate valve assembly received in each of said bores and including a disc-like valve for cooperation with each of said respective seats, each of said valves having a piston-like portion extending therefrom and loosely cooperating with said corresponding bore beyond the point of communication with said outlet port in the direction of said closed end, a flexible one-way seal associated with each one of said piston-like portions and permitting limited flow from the underside of said piston into the closed terminal portion of said bore therebeyond but preventing return flow past said piston, a passage in said housing placing said bores in communication at a point beyond said piston-like portions, the arrangement being such that upon the occurrence of pressure at one outlet opening above the value of pressure at another outlet opening, the same is transmitted from said one outlet opening of higher pressure past the corresponding piston and seal and into communication with the piston-like portion and seal of the valve member associated with said other outlet, thus causing the same to urge said last-mentioned valve toward its corresponding seat with a force effective to move said last-mentioned valve an amount to equalize the inlet pressures; and a relief valve in communication with said passage arranged to relieve a given excess of pressure in said cylinders relative to the pressure in one of said bores.

8. In a pressure regulating valve arrangement for controlling the respective pressures in a plurality of separate pressure fluid conveying lines arranged to receive equalizable pressures, means defining a first throttling valve assembly including a throttling valve positioned in a first one of said lines, means defining a second and independent throttling valve assembly including a throttling valve positioned in a second one of said lines, said throttling valve assemblies each including a motor connected therewith for actuating the same and comprising a cylinder, one end of each of said cylinders being in communication with its associated line on the downstream side of its associated valve, a piston having a loose fit in said cylinder, and a one-way seal between said piston and cylinder providing for limited pressure fluid flow past said piston to the opposite end of said motor cylinder but preventing reverse flow therefrom; means placing said opposite ends of said motor cylinders in fluid communication, the arrangement being such that the occurrence of a higher pressure in said first fluid line at the downstream side of its associated valve relative to the pressure at a similar point in said other line is effective to cause said higher pressure to be transmitted past the associated piston into the opposite end of its associated cylinder and through said last-mentioned means into the corresponding end of the other cylinder to actuate the piston associated with the throttling valve in said second line for operating the same so as to impose sufficient resistance to flow of fluid through said second line to equalize the pressure values in both of said lines on the upstream side of said valves; and a relief valve operatively arranged relative to said means placing said motor cylinder in communication to vent fluid from said opposite ends of said motor cylinders of said throttling valves back to one of said lines when the pressure in said opposite ends of said motor cylinders exceeds the pressure in said one line by a predetermined amount.

9. A flow equalizer, comprising: means defining a pair of cylindrical bores, one end of each of said bores being adapted to be connected with a source supplying separate streams of fluid under equalizable pressures, the other end of each of said bores being closed, valve seats positioned between the ends of each of said bores, means forming outlet passages from each of said bores intersecting the same at points between said valve seats and the closed ends of said bores, a separate valve assembly received in each of said bores and each including a disc-like valve for engagement with each of said respective seats, a piston-like portion extending from each of said valves beyond said position of communication with said corresponding outlet port in the direction of said closed ends, a flexible seal associated with each one of said piston-like portions and permitting limited flow from the under side of said piston into said cylindrical bore therebeyond in the direction of said closed ends, but preventing return flow past said piston, means placing said cylindrical bores in communication with one another beyond said piston-like portions, the arrangement being such that the occurrence of fluid pressure at one of said outlets above the value of fluid pressure at the other of said outlets is effective to cause a flow of liquid from said outlet of higher pressure past the corresponding piston and seal and into communication with the piston-like portion and seal of the other valve assembly, causing the same to urge said other valve toward its corresponding seat an amount sufficient to maintain the back pressure on said supply streams equal; and a relief valve in communication with said last-mentioned means arranged to relieve a given excess of pressure in said cylindrical bores relative to the pressure in one of said supply streams.

JOHN A. LAUCK.